United States Patent [19]

Takahira

[11] Patent Number: 5,182,442
[45] Date of Patent: Jan. 26, 1993

[54] LOW POWER CONSUMPTION NON-CONTACT INTEGRATED CIRCUIT CARD

[75] Inventor: Kenichi Takahira, Itami, Japan

[73] Assignee: Mitsubishi Denki Kabushiki Kaisha, Tokyo, Japan

[21] Appl. No.: 564,851

[22] Filed: Aug. 9, 1990

[30] Foreign Application Priority Data

Mar. 13, 1990 [JP] Japan .................................. 2-59928

[51] Int. Cl.⁵ ........................................... G06K 19/07
[52] U.S. Cl. .................................... 235/492; 235/436
[58] Field of Search ............... 235/280, 436, 437, 492, 235/493; 371/12, 16.3, 61-62

[56] References Cited

U.S. PATENT DOCUMENTS

| 4,766,294 | 8/1988 | Nara et al. | 235/380 |
| 4,803,351 | 2/1989 | Shigenaga | 235/492 |
| 4,816,656 | 3/1989 | Nakano et al. | 235/492 |
| 4,827,111 | 5/1989 | Kondo | 235/380 |
| 4,868,376 | 9/1989 | Lessin et al. | 235/380 |
| 4,924,075 | 5/1990 | Tanaka | 235/380 |

FOREIGN PATENT DOCUMENTS

1-191282  8/1989  Japan .

Primary Examiner—Robert Weinhardt
Attorney, Agent, or Firm—Leydig, Voit & Mayer

[57] ABSTRACT

A noncontact IC card comprises a data transmit-receive circuit for transmitting and receiving data without contact, a detection circuit for detecting a trigger signal in a signal received by the data transmit-receive circuit, a data processing circuit connected to the data transmit-receive circuit for processing the data, a clock generating circuit for supplying a clock signal to the data processing circuit, an actuating circuit for actuating the clock generating circuit in response to the detection of the trigger signal by the detection circuit, and a battery for supplying electric power to each of the above circuits.

4 Claims, 5 Drawing Sheets

LOW POWER CONSUMPTION NON-CONTACT INTEGRATED CIRCUIT CARD

BACKGROUND OF THE INVENTION

1. Field of the Invention

The present invention relates to a noncontact integrated circuit (IC) card, and more particularly to a noncontact IC card restricting the amount of electric power consumed while waiting to receive signals.

2. Description of the Related Art

In recent years, a noncontact IC card, which does not have an external electrode on the surface thereof, has been the most remarkable among the many kinds of IC cards produced. Though the noncontact IC card transmits and receives signals to and from an external device in the same manner as a normal IC card which has an external electrode, the transmission and receiving are performed by using a space transmission medium, such as electromagnetic waves, light, magnetism and so on.

A structure of a conventional noncontact IC card is shown in FIG. 5. A ROM 2 and a RAM 3 are connected through a bus 8 to a CPU 1 which controls operation of the IC card. Connected to the bus 8 is an input-output control circuit 4 which controls input and output of data to and from an external device and is connected to the input-output control circuit 4 through a modem circuit 5 and an antenna 6. Furthermore, a battery 7 is contained in the IC card so as to supply electric power to each electric circuit.

In such an IC card, if the antenna 6 receives a request signal in the form of electromagnetic waves from the external device, the request signal is input to the CPU 1 through the input-output control circuit 4 after being demodulated in the modem circuit 5. The CPU 1 decodes the request signal and produces a predetermined response signal. The response signal is input to the modem circuit 5 through the input-output control circuit 4, modulated, and then transmitted to the external device from the antenna 6.

However, it is required that the CPU 1, the modem circuit 5 and so on always be operated on standby so that the IC card can receive and processes the request signal from the external device. Therefore, electric power is always being consumed in order to operate the CPU 1, the modem circuit 5 and so on, and this causes a problem in that the electric power supplied by the contained battery 7 is rapidly consumed.

SUMMARY OF THE INVENTION

The present invention is intended to solve the above problem and an object of the present invention is to provide a noncontact IC card which can with certainty receive and process a request signal from an external device while restricting the consumption of the electric power supplied by the battery contained in the IC card.

A noncontact IC card according to the present invention comprises a data transmit-receive means for transmitting and receiving data in a noncontact manner, a detection means for detecting a trigger signal from a signal received by the data transmit-receive means, a data processing means connected to the data transmit-receive means for processing the data, a clock generating means for supplying a clock signal to the data processing means, an actuating means for actuating the clock generating means in response to the detection of the trigger signal by the detection means, and a battery for supplying electric power to each of the above means.

A noncontact IC card according to another embodiment of the invention comprises a data transmit-receive means for transmitting and receiving data in a noncontact manner, a detection means for detecting a trigger signal from a signal received by the data transmit-receive means, a data processing means connected to the data transmit-receive means for processing the data, a clock generating means for supplying a clock signal to the data processing means, an actuating means for actuating the clock generating means in response to the detection of the trigger signal by the detection means, a first stop means for stopping the clock generating means after inputting the clock signal from the clock generating means actuated by the actuating means and executing a predetermined process, and a battery for supplying electric power to each of the above means.

A noncontact IC card according to still another embodiment of the invention comprises a data transmit-receive means for transmitting and receiving data in a noncontact manner, a detection means for detecting a trigger signal from a signal received by the data transmit-receive means, a data processing means connected to the data transmit-receive means for processing the data, a clock generating means for supplying a clock signal to the data processing means, an actuating means for actuating the clock generating means in response to the detection of the trigger signal by the detection means, a first stop means for stopping the clock generating means after inputting the clock signal from the clock generating means actuated by the actuating means and executing a predetermined process, a measuring means for measuring the time required from when the data process means transmits a response signal through the data transmit-receive means until the data transmit-receive means receives subsequent data, a second stop means for stopping the clock generating means when the required time measured by the measuring means exceeds a predetermined value, and a battery for supplying electric power to each of the above means.

In the noncontact IC card of the present invention, when the detection means detects the trigger signal from the received signal, the clock generating means is actuated by the actuating means and the clock signal is supplied to the data processing means.

In the noncontact IC card of the invention, in addition, after the data processing means executes a predetermined process, the first stop means stops the clock generating means.

Furthermore, in the noncontact IC card of the invention, after the data processing means executes a predetermined process, the first stop means stops the clock generating means, and if the time required from when the data process means transmits a response signal until the data transmit-receive means receives subsequent data exceeds a predetermined value, the second stop means stops the clock generating means.

DESCRIPTION OF THE PREFERRED EMBODIMENTS

Referring to the accompanying drawings, preferred embodiments of the present invention will be hereinafter described.

Figure 1:
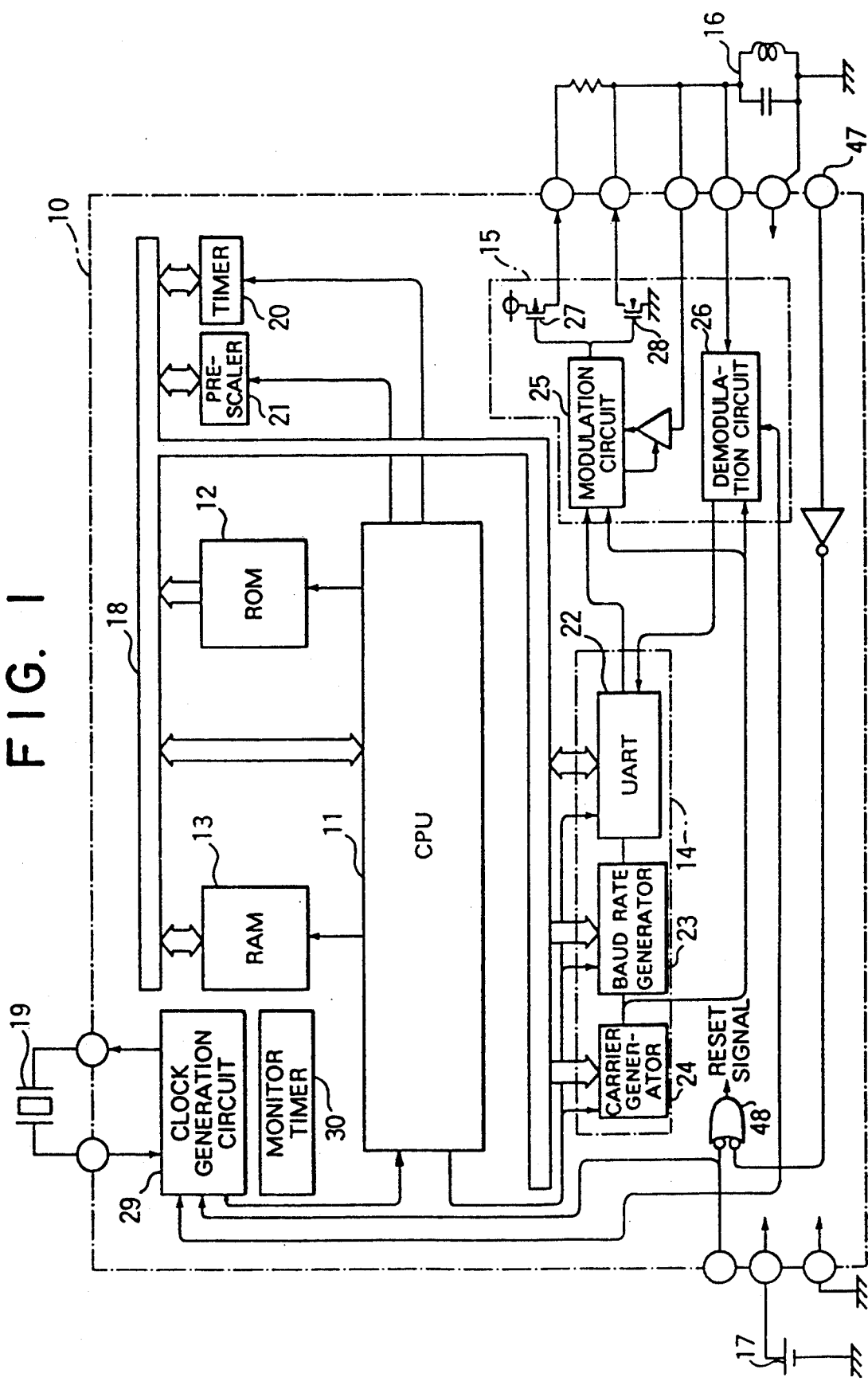
FIG. 1 is a block diagram showing a structure of a noncontact IC card according to an embodiment of the present invention.

As shown in FIG. 1, a noncontact IC card according to an embodiment of the present invention includes an IC 10, connected to the IC 10 are an antenna circuit 16, a battery 17 and a crystal oscillator 19. The IC 10 comprises a CPU 11 connected to a bus 18. Connected to the bus 18 are a ROM 12 for storing a program for controlling operations of the CPU 11, a RAM 13 for storing data and an input-output control circuit 14 for controlling input and output of data from and to an unillustrated external device. Furthermore, a timer 20, for dividing and counting a clock signal produced by an internal clock, and a prescaler 21, for setting an initial value of the timer 20, are connected to the bus 18.

The input-output control circuit 14 comprises a UART 22 for executing serial asynchronous data transmission, a baud rate generator 23 for setting the transmission rate of the UART 22, and a carrier generator 24 for generating a carrier. A modem circuit 15 is connected to the input-output control circuit 14 and the antenna circuit 16 is connected to the modem circuit 15. The modem circuit 15 comprises a modulation circuit 25 for modulating a carrier with the output of the UART 22, a demodulation circuit 26 for demodulating an input signal from the antenna circuit 16, and output transistors 27 and 28 for driving the antenna circuit 16.

Furthermore, a clock generating circuit 29 for supplying a clock signal to each circuit in the IC 10 is connected to the CPU 11 and the demodulation circuit 26 in the modem circuit 15. The clock generating circuit 29 is connected to the crystal oscillator 19 outside of the IC 10. 30 denotes a monitor timer for monitoring runaway of the CPU 11.

The modem circuit 15 and the antenna circuit 16 constitute a data transmit-receive means, the CPU 11 constitutes a data processing means, the crystal oscillator 19 and the clock generating circuit 29 constitute a clock generating means, and the timer 20 and the prescaler 21 constitute a measuring means.

Figure 2:
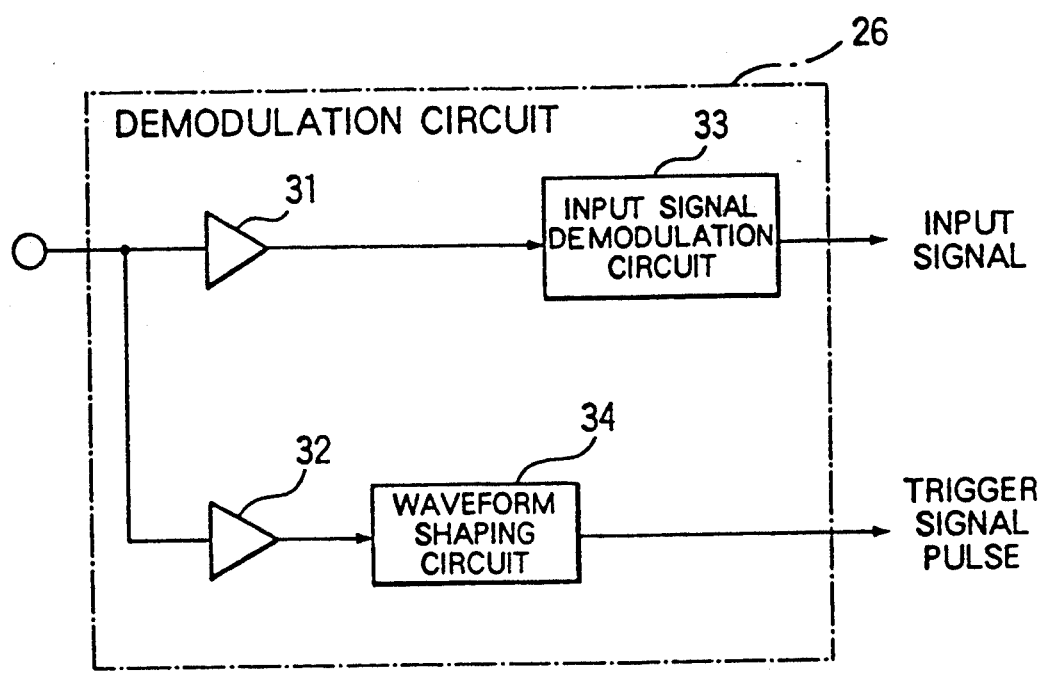
FIG. 2 is a block diagram showing an internal structure of a demodulation circuit.

FIG. 2 shows an internal structure of the demodulation circuit 26 in the modem circuit 15. A first comparator 31 and a second comparator 32, for comparing the amplitude of a detection signal, are respectively connected to an input signal demodulation circuit 33 and a waveform shaping circuit 34. A threshold value Vt1 for detecting a request signal is set in the first comparator 31 and a threshold value Vt2 for detecting a trigger signal is set in the second comparator 32. These threshold value Vt1 and Vt2 are designed so that the following relation is maintained for a level Vs1 of a request signal and a level Vs2 of a trigger signal:

$$Vt1 < Vs1 < Vt2 < Vs2 \qquad 1$$

Furthermore the input signal to the demodulation circuit 33 is connected to the UART 22 and the waveform shaping circuit 34 is connected to the clock generating circuit 29.

The second comparator 32 and the waveform shaping circuit 34 constitute a detection means for detecting a trigger signal.

Figure 3:
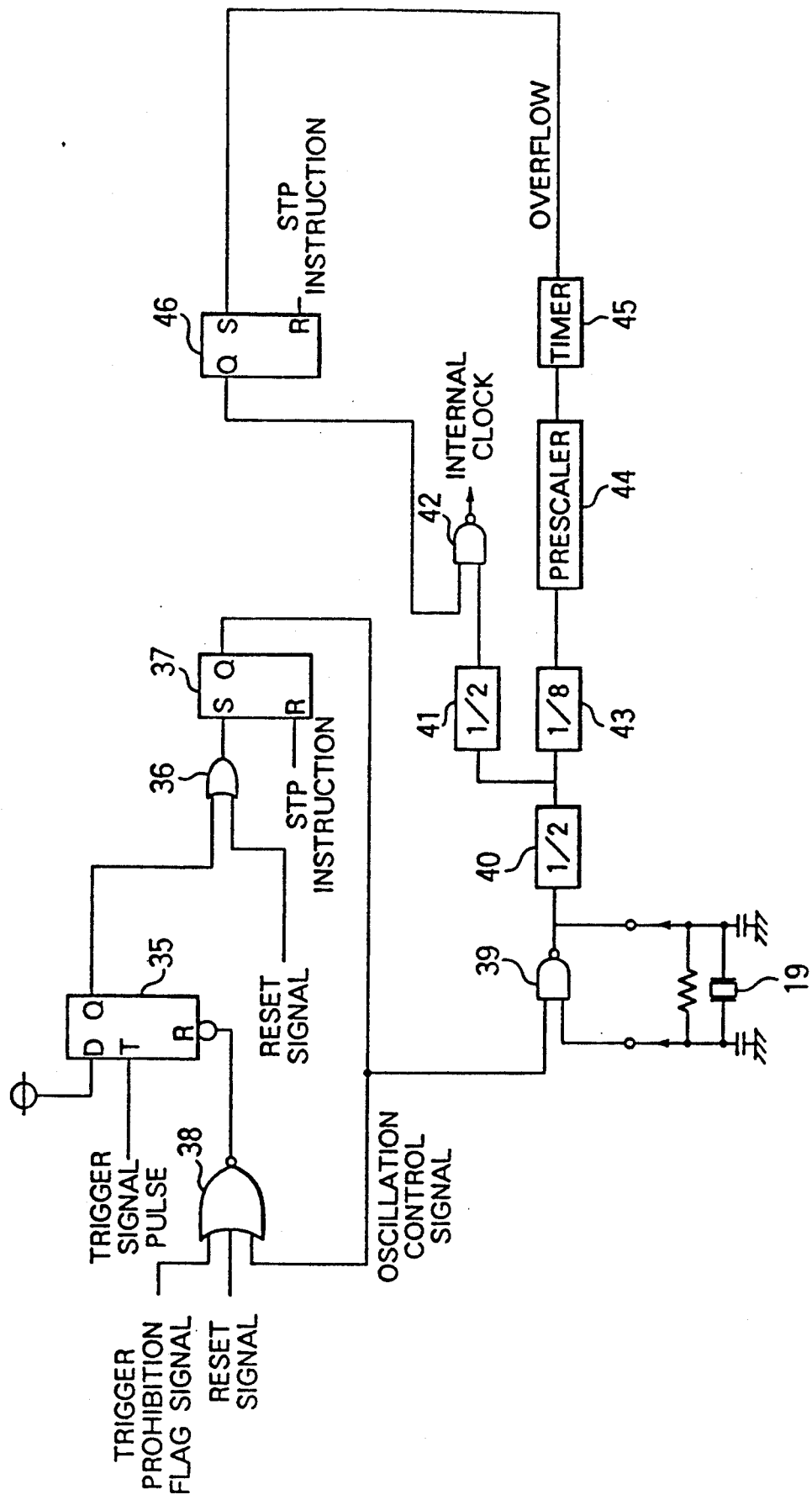
FIG. 3 is a block diagram showing an internal structure of a clock generating circuit.

The internal structure of the clock generating circuit 29 is shown in FIG. 3. A set terminal S of a second flip flop 37 is connected to an output terminal Q of a first flip flop 35 through an OR circuit 36. The output terminal Q of the second flip flop 37 is connected to a reset terminal R of the first flip flop 35 through a NOR circuit 38 and connected to each circuit, such as the CPU 11, in the IC 10 through a NAND circuit 39, ½ dividers 40 and 41 and a NAND circuit 42. An output of the ½ divider 40 is connected to a set terminal S of a third flip flop 46 through a ½ divider 43, prescaler 44 and a timer 45, and an output terminal Q of the flip flop 46 is connected to the NAND circuit 42. Furthermore, connected to the NAND circuit 39 is the crystal oscillator 19.

The first and second flip flops 35 and 37, the OR circuit 36, the NOR circuit 38 and the NAND circuit 39 constitute an actuating means and first and second stop means.

Next, operations of the embodiment will be explained. First, as shown in FIG. 1, while waiting to receive a trigger signal from an unillustrated external device, the CPU 11 outputs an STP instruction to the clock generating circuit 29 so that generation of an internal clock is stopped.

When the external device transmits a trigger signal and a subsequent request signal, it is determined in the demodulation circuit 26 in the modem circuit 15 whether the signal received through the antenna circuit 16 is a trigger signal or a request signal. The received trigger and request signals respectively have the levels Vs1 and Vs2 shown in the above equation 1. If a trigger signal is first received, since the level Vs2 of the trigger signal is higher than the threshold value Vt2 of the second comparator 32 shown in FIG. 2 a trigger signal pulse is output from the second comparator 32 to the clock generating circuit 29 through the waveform shaping circuit 34.

The trigger signal pulse is input to a trigger terminal T of the first flip flop 35 shown in FIG. 3. The flip flop 35 detects a leading edge of the trigger signal pulse and outputs a "H"-level signal from the output terminal Q to the set terminal S of the second flip flop 37 through the OR circuit 36, and then the second flip flop 37 outputs a "H"-level oscillation control signal from the output terminal Q to the NAND circuit 39. This causes oscillation of the crystal oscillator 19 to start and an output of the NAND circuit 39 is divided by 4 by the ½ dividers 40 and 41 and output as an internal clock signal from the NAND circuit 42 to each circuit in the IC 10. In actuality, the ½ divider 43, the prescaler 44, the timer 45 and the third flip flop 46 operate in order to cause a delay until the oscillation waveform becomes stable, and after a predetermined time has passed since the crystal oscillator 19 started oscillating, the internal clock signal is output.

Figure 4:
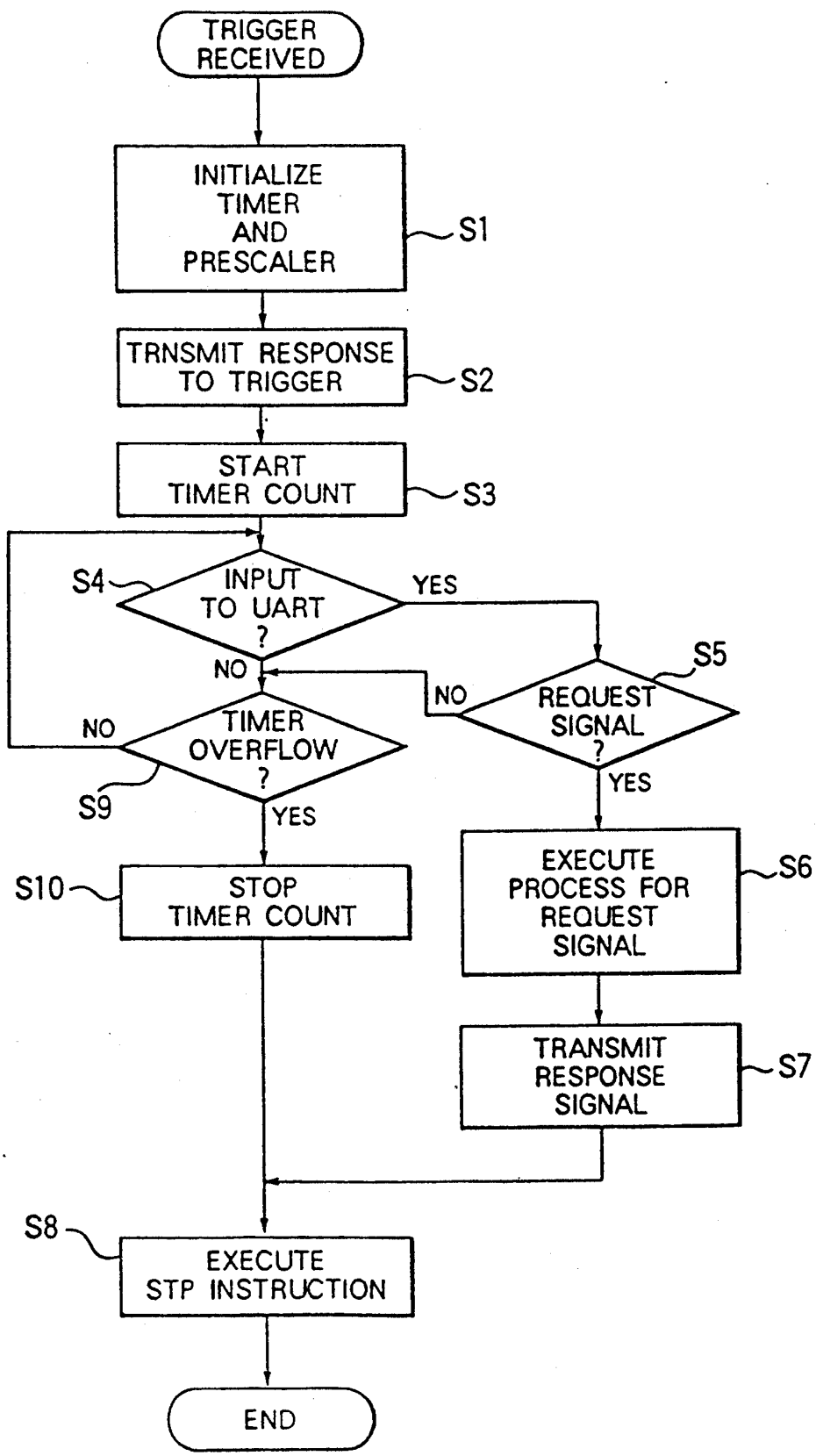
FIG. 4 is a flowchart illustrating the operation of an embodiment of the invention.
Figure 5:
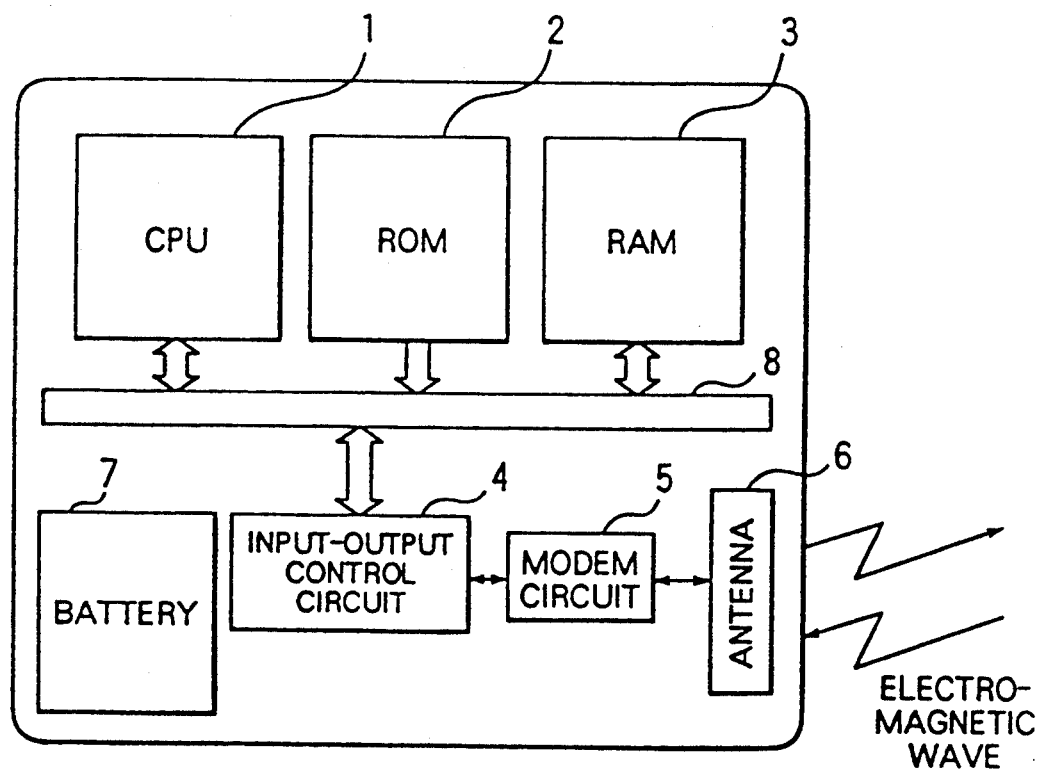
FIG. 5 is a block diagram showing a structure of a conventional noncontact IC card.

When the internal clock is thus actuated, the CPU 11 reads a program from the ROM 12 shown in FIG. 1 and executes data processing according to a flowchart shown in FIG. 4. The timer 20 for monitoring receiving of a request signal and the prescaler 21 are initialized in Step S1. Then, a response signal to the trigger signal is transmitted to the external device through the input-output control circuit 14, the modem circuit 15 and the antenna circuit 16 in Step S2.

After that, the timer 20 and the prescaler 21 are set in an enabled state and the counting by the timer 20 is started in Step S3. It is determined, based on the state of the UART 22, whether or not the data is input through the demodulation circuit 26 in Step S4. If the input of data is confirmed, the content of the received data is read out from the UART 22 and it is determined whether or not the data is a request signal in Step S5. The request signal should be at least an 8-bit data string and it is required to be read out for a predetermined length.

If it is determined in Step S5 that the data is a request signal, after an internal process in accordance with the request signal is executed in Step S6, a response signal is transmitted to the external device in Step S7. When the transmission is completed, a STP instruction is output to the clock generating circuit 29 in Step S8. The STP instruction is input to reset terminals R of the second and third flip flops 37 and 46 shown in FIG. 3 so as to make the output terminals Q of the flip flops 37 and 46 "L"-level. This "L"-level signal closes the NAND circuits 39 and 42 and stops the oscillation of the crystal oscillator 19 and the output of the internal clock.

On the other hand, if it is not confirmed in Step S4 that the data is input to the UART 22, or if it is determined in Step S5 that the data is not a request signal, overflow of the timer 20 is checked in Step S9. If the timer 20 does not overflow, Step S4 is repeated and it is determined again whether the data is input to the UART 22. However, if the timer 20 overflows, it is determined that something wrong has happened because the time from when the trigger signal is received until the time when the request signal is received is too long, and the counting of the timer 20 is stopped in Step S10. Then, an STP instruction is executed in Step S8 and the internal clock is stopped.

After this, in order to actuate again the internal clock and operate the CPU 11, it is necessary to receive a trigger signal from the external device or input a reset signal from the reset terminal 47 of the IC 10 shown in FIG. 1 to the clock generating circuit 29 through the OR circuit 48.

When a reset signal is input from the reset terminal 47, the reset signal is input to the reset terminal R of the first flip flop 35 through the NOR circuit 38 shown in FIG. 3 and to the set terminal S of the second flip flop 37 through the OR circuit 36.

Furthermore, besides a reset signal and an oscillation control signal, which is an output of the output terminal Q of the second flip flop 37, a trigger prohibition flag signal for prohibiting a trigger can also be input to the NOR circuit 38. When the reset input to the first flip flop 35 through the NOR circuit 38 is at the "L"-level, the trigger signal pulse is not available.

The first flip flop 35 detects a leading edge of the trigger signal pulse and outputs an "H"-level signal from the output terminal Q, and therefore, if an extremely long trigger signal pulse is received, that is, a trigger signal is not in a pulse form, but remains at "H"-level, after the CPU 11 executes a STP instruction in response to the overflow of the timer 20, the first flip flop 35 is not set until the trigger signal once again reaches the "L"-level. Therefore, it is possible to certainly stop oscillation of the internal clock.

What is claimed is:

1. A non-contact IC card comprising:
    data transmit-receive means including an antenna for transmitting a response signal to and receiving trigger and request signals from a terminal unit, a modulation circuit for modulating response signals for transmission form said antenna, and a demodulation circuit for demodulating trigger and request signals received through said antenna, said modulation and demodulation circuits being connected to said antenna, said demodulation circuit including detection means for discriminating between a trigger signal having a first magnitude in signals received through said antenna by said data transmit-receive means;
    data memory means for storing data;
    data processing means connected to said data memory means and to said data transmit-receive means for processing data stored in said data memory means in response to a request signal and for outputting a response signal based on the data processing;
    clock signal generating means for generating and supplying a clock signal to said data processing means, connected to said data processing means and said data transmit-receive means and including actuating means for actuating said clock signal generating means when said detection means detects a trigger signal in a signal received by said data transmit-receive means through said antenna, wherein said clock signal generating means includes a clock signal generating circuit having first stop means for stopping generation of the clock signal by said clock signal generating means after (i) actuation of said clock signal generating means by said actuating means, (ii) data processing by said data processing means, said (iii) output of a response signal by said data processing means to the terminal unit through said data transmit-receive means and said antenna; and
    a battery for supplying electrical power to said data transmit-receive means, data memory means, data processing means, and clock signal generating means.

2. The non-contact IC card as claimed in claim 1 wherein said detection means includes a comparator for discriminating between a trigger signal and a request signal in signals received by said transmit-receive means.

3. A non-contact IC card comprising:
    data transmit-receive means including an antenna for transmitting a response signal to and receiving trigger and request signals from a terminal unit, a modulation circuit for modulating response signals for transmission from said antenna, and a demodulation circuit for demodulating trigger and request signals received through said antenna, said modulation and demodulation circuits being connected to said antenna, said demodulation circuit including detection means for discriminating between a trigger signal having a first magnitude and a request signal having a second magnitude different from the first magnitude in signals received through said antenna by said data transmit-receive means;
    data memory for storing data;
    data processing means connected to said data memory means and to said data transmit-receive means for processing data stored in said data memory means in response to a request signal, for outputting a response signal based on the data processing, and for outputting a response signal to said data transmit-receive means after said data transmit-receive means receives a trigger signal;

clock signal generating means for generating and supplying a clock signal to said data processing means connected to said data processing means and said data transmit-receive means and including actuating means for actuating said clock signal generating means when said detection means detects a trigger signal in a signal received by said data transmit-receive means through said antenna, wherein said clock signal generating means includes a clock signal generating circuit having first stop means for stopping generating of the clock signal by said clock signal generating means after (i) actuation of said clock signal generating means by said actuating means, (ii) data processing by said data processing means, and (iii) output of a response signal by said data processing means to the terminal unit through said data transmit-receive means and said antenna;

time measuring means for measuring elapsed time from output by said data processing means of a response signal through said data transmit-receive means until said data transmit-receive means receives a request signal through said antenna wherein said clock signal generating means includes second stop means for stopping said clock signal generating means when the elapsed time measured by said time measuring means exceeds a predetermined duration; and a battery for supplying electrical power to said data transmit-receive means, data memory means, data processing means, clock signal generating means, and time measuring means.

4. The non-contact IC card as claimed in claim 3 wherein said detection means includes a comparator for discriminating between a trigger signal and a request signal in signals received by said transmit-receive means.

* * * * *